INVENTOR
T. J. SCARPA
BY Martha H Pugh
ATTORNEY

Aug. 15, 1967 T. J. SCARPA 3,335,606
DOUBLE THERMISTOR FLOWMETERS
Filed June 16, 1964 6 Sheets-Sheet 3

INVENTOR
T. J. SCARPA
BY Martha G. Pugh
ATTORNEY

Aug. 15, 1967  T. J. SCARPA  3,335,606
DOUBLE THERMISTOR FLOWMETERS
Filed June 16, 1964
6 Sheets-Sheet 4
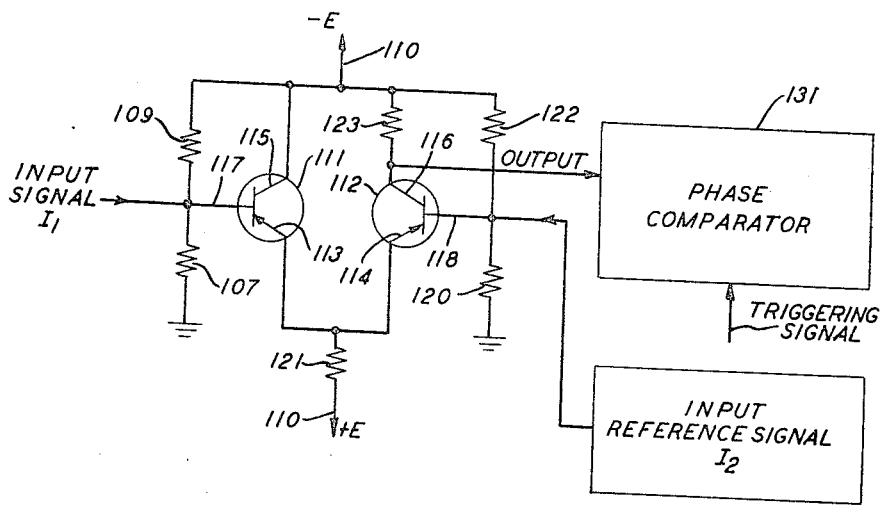
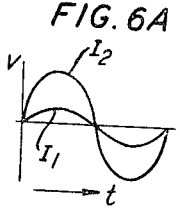
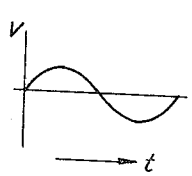
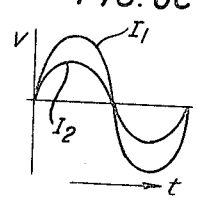
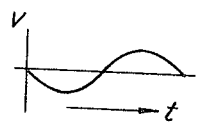
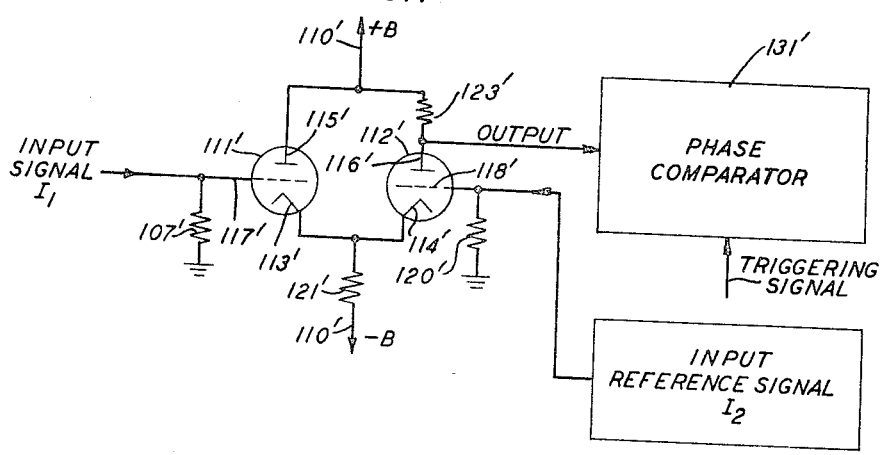
INVENTOR
T. J. SCARPA
BY Martha H. Pugh
ATTORNEY

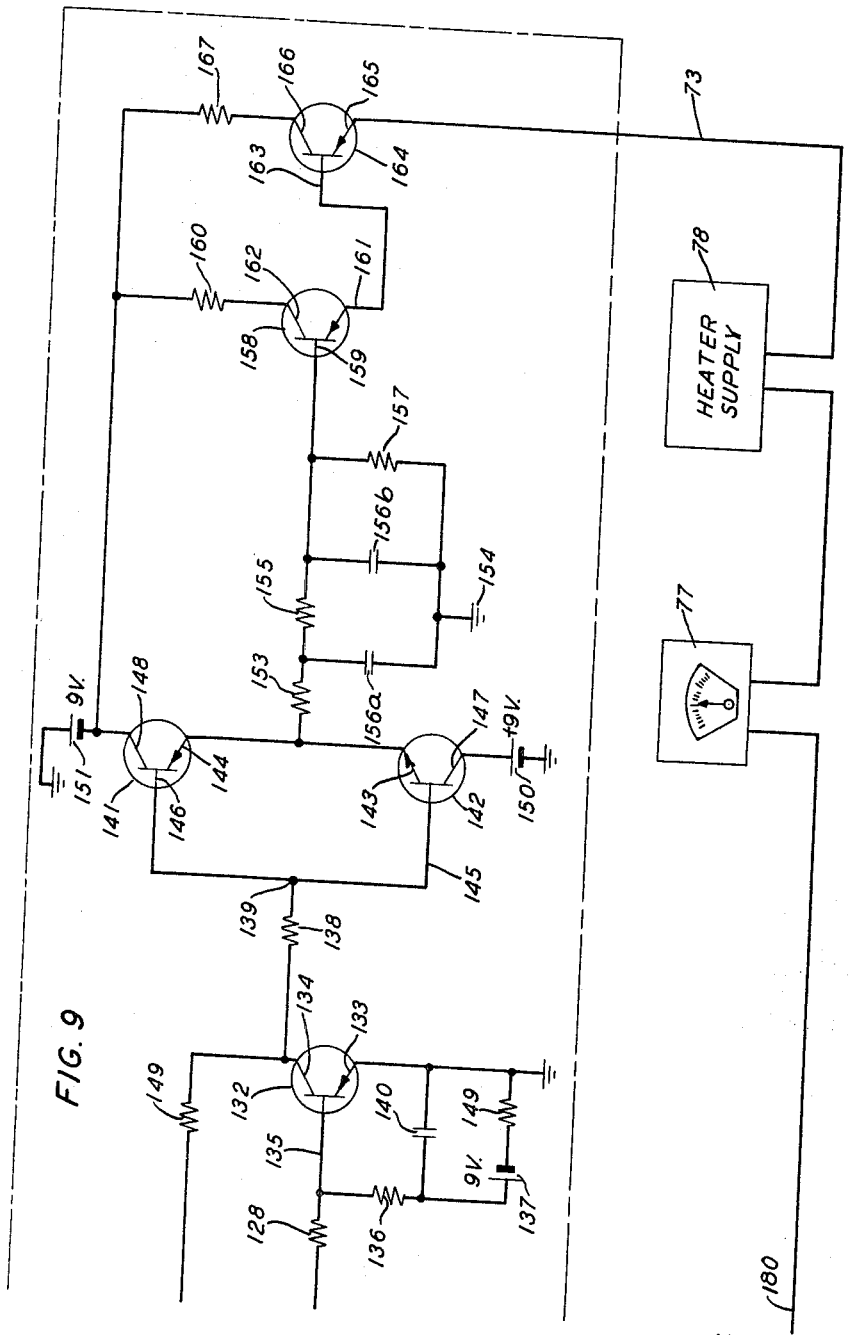

3,335,606
DOUBLE THERMISTOR FLOWMETERS
Thomas J. Scarpa, Metuchen, N.J., assignor, by mesne assignments, to Edison Instruments, Inc.
Filed June 16, 1964, Ser. No. 375,537
25 Claims. (Cl. 73—204)

This invention relates in general to flowmeters and more particularly to thermistor flowmeters which rely on balancing the responses between a test thermistor and a control thermistor in a differential amplifier circuit.

Prior art flowmeters may be divided into several general categories including mechanical or rotary types, differential pressure types, and electronic types, the latter relying on the transmission of ultrasonic waves or heat radiation in the tested fluid. In all of these types, the dynamic range over which the device is operative is strictly limited, for example, in most of the mechanical or pressure types, to a maximum of about ten to one; and even in the most improved electronic types to a maximum of about one hundred to one. In the present context, dynamic range is construed as extending from the first detectable flow at which the flowmeter is operative to a flow rate at which the indicator becomes saturated or so nonlinear as to be useless. In addition to the foregoing, another disadvantage inherent in certain prior art types of flowmeters is the presence of a distinctly detectable pressure drop interposed by the probe or working elements of the flowmeter penetrating into the path of the flow.

Accordingly, it is the object of the present invention to provide an improved flowmeter combination, more specifically, one in which very low flows are readily detectable and wherein the upper end of the dynamic range is limited only by the capacity of the power supply. Another object of the present invention is to provide a flowmeter the sensitivity of which is readily controlled and which responds to variations in the flow rate in a manner which is substantially more linear than achieved with prior art devices.

A further object is to provide a flowmeter in which the active element is interposed into the flow in such a manner as to minimize the disturbance created by its presence.

An auxiliary object of the invention is to provide greater circuit facility for comparing a derived signal with a reference signal.

These and other objects, features, and advantages of the present circuit are provided in a flowmeter in accordance with the present invention which comprises as one of its working elements a probe, including a pair of thermistors, which is interposed into the path of the flow at a precise point wherein the disturbance or distortion to the flow is at a minimum. Of the two thermistors included in the probe, only one, which is surrounded by a heating coil, is responsive to changes in the rate of flow, whereas the other serves as a control, responsive only to changes in the ambient conditions in the environment of the flow. The two thermistors are housed together in an epoxy plug, supported in a pipe fitting which is screwed or otherwise interposed into the pipe section in the path of the flow to be measured. When the fluid under test begins to flow, heat is conducted away from the thermistor surrounded by the heating coil causing it to undergo a temperature change which is a function of the rate of flow, changes in ambient temperature being compensated for by the presence of the control thermistor in contact with the test fluid.

The control thermistor and the flow measuring thermistor are connected as separate arms of a conventional bridge circuit which is completed by two balancing arms. One pair of terminals of the bridge circuit is connected across an alternating current source; whereas the diametrically opposite pair of bridge terminals is connected across a circuit which is so constructed that the output voltage, which has the same frequency characteristic as the signal interposed from the alternating current source, varies in polarity and magnitude in accordance with the difference in response between the flow measuring thermistor and the control thermistor.

In one embodiment, the unbalanced output of the Wheatstone bridge is combined with a polarity balanced alternating current signal, and the composite signal is fed into an electronic servo system of the type described in detail in my application Ser. No. 375,501, filed at even date herewith. The latter comprises a pair of trigger circuits in balanced arrangement which are actuated in alternation with equal dwell times by the unbiased alternating current signal. A small direct current bias imposed on the alternating current signal causes the trigger circuits to operate, still in alternation but with unequal dwell times; whereas, a large direct current bias causes one trigger circuit to operate continuously, to the exclusion of the other, thereby producing a continuous signal of one polarity. The output from the two trigger circuits is summed at a summing point, across which is connected a capacitor which is charged or discharged, in accordance with the polarity of the output voltage at the summing point. The potential across the capacitor is continuously sensed and compared with a reference value, the difference potential being utilized to drive a heater supply circuit to energize or deenergize the heater coil on the one thermistor in such a direction as to restore a condition of balance to the bridge circuit. A wattmeter connected to the heater supply source measures the energy supplied to the heater circuit. This may be calibrated to read velocity of flow in the flowmeter; or alternatively, the wattmeter can also be calibrated to read in terms of volumetric flow or mass flow in the flowmeter. To provide a wide range, the meter may be calibrated on a logarithmic scale.

In accordance with an alternative embodiment of the invention, the unbalanced output voltage across the Wheatstone bridge circuit is imposed across a novel differential amplifier circuit which produces an output voltage which is either in phase or 180 degrees out of phase with the signal imposed across the bridge circuit by an alternating current oscillator, depending on whether the response in the flow measuring thermistor is less or greater than the response of the control thermistor. This phase reversible output signal, after amplification, is imposed on a gating circuit which is synchronized with square-wave pulses triggered by the alternating current oscillator to modulate the amplified signal in a series of pulses, the polarity of which depends on the relative amplitudes of the two thermistor signals. The pulse series is again amplified and imposed on an integrator circuit including a capacitor, which is charged or discharged depending on the polarity of the imposed pulses. The output from the integrator circuit drives a power circuit which, as in the embodiment previously referred to, is connected through a wattmeter to the heater coil surrounding one of the thermistors. The power circuit is caused to increase or decrease the energy supplied to the heater in such a manner as to tend to rebalance the bridge circuit. The wattmeter, as in the previously described embodiment, can be calibrated to read in terms of velocity of flow, volumetric flow or mass flow in the flowmeter.

The most important advantage of the flowmeter circuits of the present invention are that they are designed to detect flows down to a small fraction of a gallon per minute; and further, to measure flows over a wide range, the upper limit of which is dependent only on the necessary power supplied to the circuit to replace the heat dissipated by the thermistor in response to the flow. Thus, the present circuit has been utilized to detect flows as high as, for example, 10,000 gallons per minute. In addition, the sensitivity of the flowmeter is readily adjusted for any condition by merely changing the temperature difference between the thermistors under the no-flow condition. Moreover, the design and placement of the probe in the pipe are contrived, in accordance with this invention, to minimize the pressure drop within the pipe, and to provide for a substantially uniform response, notwithstanding changes in the velocity profile of the fluid flowing in the conduit due to changes in roughness of the interior pipe surface.

These and other objects, features, and advantages will be apparent to those skilled in the art upon a detailed study of the specification hereinafter, including the attached drawings, in which:

FIGURE 1 is a block diagram showing in combination the various components of the flowmeter of the present invention, FIGURE 2 is a schematic showing of an electronic servo system, such as disclosed in application Ser. No. 375,501, filed at even date herewith, which is incorporated as a component of a preferred embodiment of the present invention;

FIGURES 3A, 3B, and 3C are detailed showings in front elevation, longitudinal section, and cross section, respectively, of the probe assembly of the flowmeter of the present invention;

FIGURE 5 is a schematic showing of a differential amplifier circuit of the present invention which is incorporated as part of an alternative embodiment of the invention;

Figure 8:
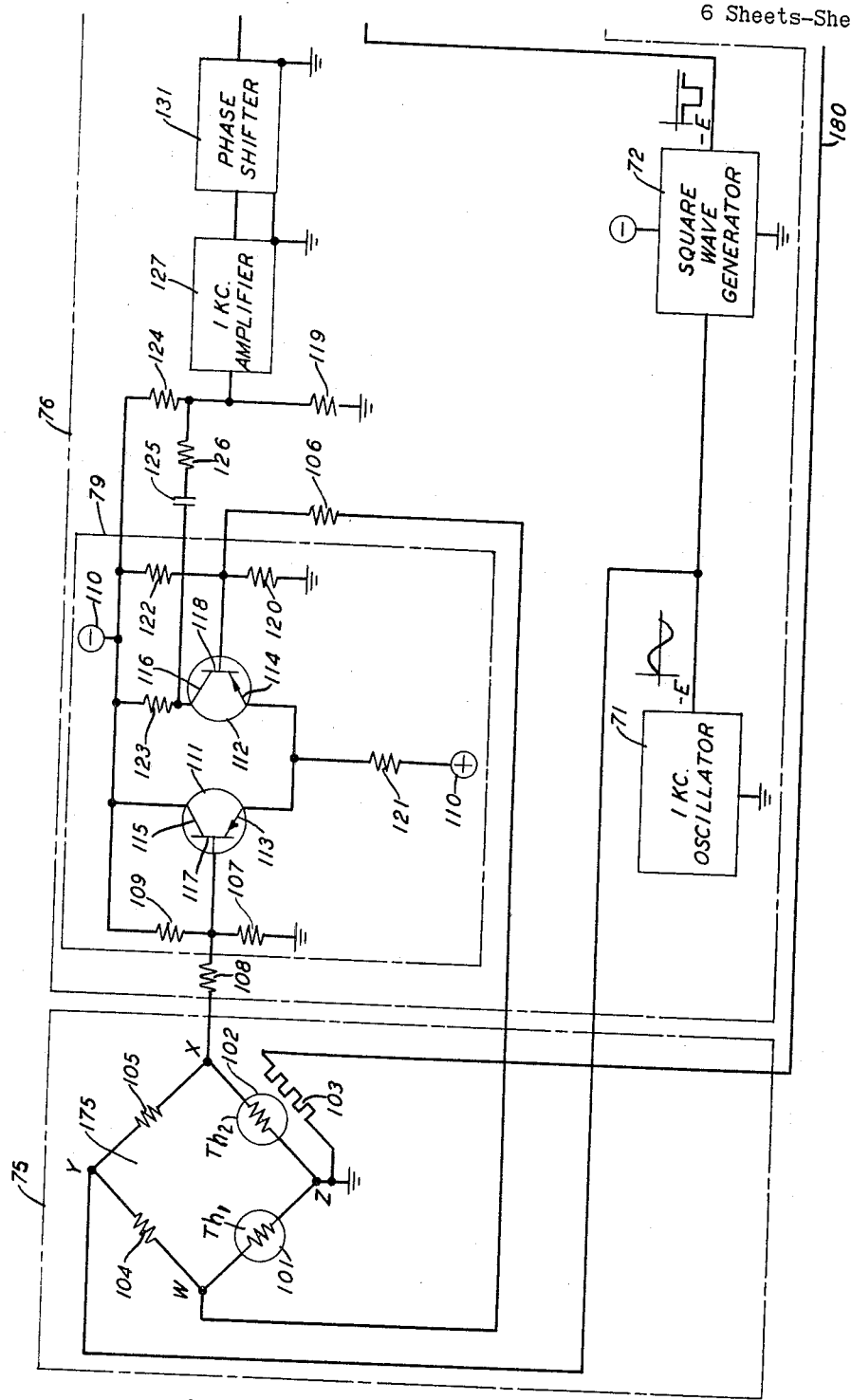

FIGURES 6A, 6B, 6C, and 6D are diagrams of signal voltage plotted against time to illustrate the theory of operation of the circuit of FIGURE 5;

FIGURE 7 is a schematic showing of a modification of the differential amplifier circuit of FIGURE 5; and FIGURES 8 and 9, mounted with FIGURE 8 to the left and FIGURE 9 to the right, constitute an over-all schematic showing of an alternative embodiment of the flowmeter of the present invention, including the differential amplifier of FIGURE 5.

Referring in detail to the block diagram indicated in FIGURE 1 of the drawings, a pair of thermistors 101 and 102 are mounted side-by-side in an epoxy plug in a probe assembly which will be described hereinafter in detail with reference to FIGURES 3A, 3B, and 3C of the drawings. Thermistor 102, which normally has about one-third the resistance of thermistor 101, is wrapped with a heating coil 103.

Thermistors 101 and 102, in the probe assembly to be described, are interposed into the interior of pipe 100 in contact with the test fluid. The optimum position of the probe in the test pipe is critical, as will be discussed hereinafter with reference to FIGURE 4 of the drawings.

The heater 103 which is wrapped around thermistor 102, is supplied with energy from the heater supply source 78, which may comprise any type of power source well-known in the art, which is constructed to provide a power output ranging up to 500 milliwatts, with a voltage drop ranging from one to five volts across heater 103, at a frequency of, say 60 cycles per second. The thermistors 101 and 102 are connected into a Wheatstone bridge 75, which is adjusted to balance under a condition of no-flow in the test conduit.

The flowmeter operates essentially as a self-balancing calorimeter. When the bridge 75 becomes unbalanced due to flow, heat loss from thermistor 102 is automatically replenished by operation of the electro servo circuit 76 which actuates the heater supply 78 to increase the amount of heat delivered to the heater circuit 103. The actual power required to operate the flowmeter is measured on a milliwatt meter 77.

The following are theoretical considerations on which the calibration of the flowmeter of the present invention is based.

Assume that the probe including thermistors 101 and 102 is interposed into pipe 100 full of fluid whose flow rate is to be measured. Bridge 75 is adjusted for a condition of balance for no-flow in pipe 100. By means of the operation of servo system 76, the bridge 75 is continuously rebalanced during the flow in pipe 100, in such a manner that the temperature differential ΔT between the thermistors 101 and 102 is maintained constant.

A quantity of power P from the heater supply circuit 78, which passes through the milliwatt meter 77 into heater circuit 103 is required to bring about a condition of rebalance of bridge circuit 75. This is equated to the amount of heat energy dissipated from thermistor 102 by fluid flow in the pipe, by employing Joule's conversion constant, $J=4.187$.

Assume a cylindrical slice of pipe whose thickness equals the distance between thermistors 101 and 102 in the direction of flow. Let the heat dissipated in this slice by flow in the pipe be designated H. Then $$H = \frac{V}{\Delta t} \cdot d \cdot c_v \cdot \Delta T \quad (1)$$

where:

$V/\Delta t$=volumetric flow in gallons per second,
$d$=density of test fluid,
$c_v$=specific heat of test fluid at constant volume, and
$\Delta T$=constant temperature differential between thermistors 101 and 102.

But $$P = J \cdot H = 4.187H \quad (2)$$

and $$P = 4.187 \frac{V}{\Delta t} \cdot d \cdot c_v \cdot \Delta T \quad (3)$$

or $$P = K \frac{V}{\Delta t} \quad (4)$$

where the quantities J, d, $c_v$, and ΔT are constant for any given operation.

Thus, from Equation 4 it is seen that a flowmeter in accordance with the present invention can be calibrated in terms of velocity of flow (feet per second), assuming a pipe to be of uniform cross section, or volumetric flow (cubic feet or gallons per second), or mass flow (pounds per second).

Calibration of a flowmeter in accordance with the present invention may be carried out as follows:

(a) Water is passed at a known rate through a pipe of uniform cross section, and indications on milliwatt meter 77 are marked in terms of velocity, e.g. feet per second; or (b) a known volume of water is pumped through the test pipe section over a measured time interval, and the milliwatt meter 77 is calibrated in volumetric terms, e.g. gallons per second; or (c) Water is pumped over a measured time interval into a tank placed on a scale, and the milliwatt meter 77 is calibrated in mass terms, e.g. pounds per second.

In order to adapt the initial calibrations to pipe sections having different cross sectional areas, they are multiplied by the inverse ratios of the cross sectional areas.

To adapt the calibrations to fluids other than water, since both the density and specific heat of water are substantially unity, the velocity and volumetric flow calibrations are divided by the specific heat of the test fluid, whereas the mass flow calibration is divided by the product of the specific heat and density of the test fluid. Extensive tests have shown that a unit calibrated in the laboratory using water can be subsequently taken into the field and accurately read on the flow of other fluids, such as, for example, methane gas.

The accuracy of the calibrations assumes the specific heat of the material being metered to be substantially constant, which is a correct assumption for the majority of applications. For instances in which the specific heat may vary over a wide range, additional probe elements and circuitry may be provided to cancel these variations from the flow reading.

Figure 2:
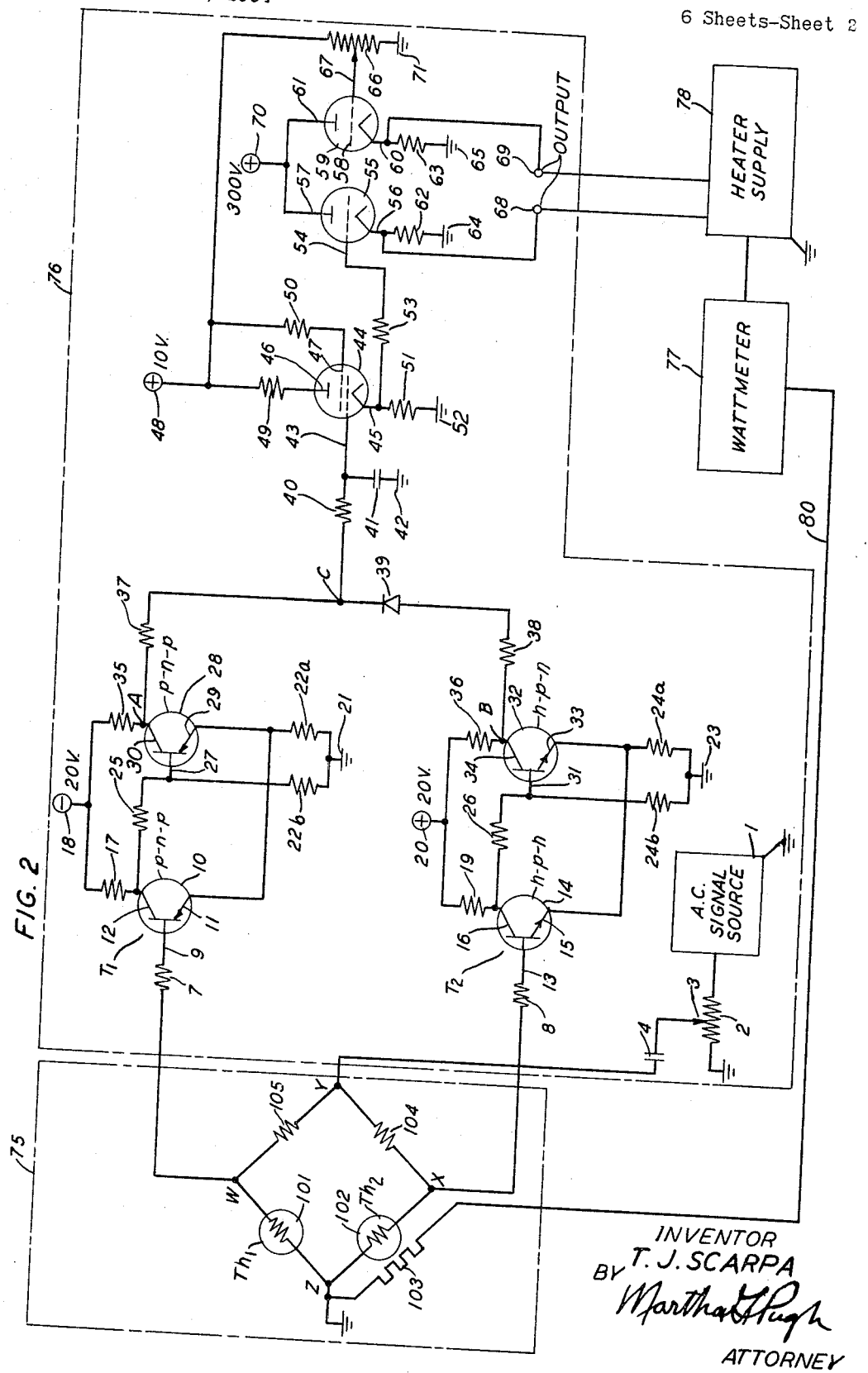

Referring to FIGURE 2 of the drawings which shows the circuit schematic for a preferred embodiment of the invention, a pair of thermistors 101 and 102 are connected in a Wheatstone bridge 75 with resistors 104 and 105 respectively in the balancing arms. In the embodiment under description, thermistors $Th_1$ and $Th_2$ are, for example, precision thermistors manufactured by the YSI Components Division, Yellow Springs, Ohio, meeting the following specifications:

TABLE II

| No. | Manufacturer | Type | Emitter-Base Impedance, ohms | Emitter-Base Saturation Voltage | |
|---|---|---|---|---|---|
| | | | | Minimum, volts | Maximum, volts |
| 2N1303 | General Electric Company | p-n-p | 320 | 0.15 | 0.4 |
| 2N1304 | do | n-p-n | 320 | 0.15 | 0.4 |
| 2N1305 | Radio Corporation of America | p-n-p | 450 | 0.15 | .35 |
| 2N1306 | do | n-p-n | 450 | 0.15 | .35 |
| 2N1307 | do | p-n-p | 480 | 0.15 | .35 |
| 2N1308 | do | n-p-n | 480 | 0.15 | .35 | of any of the types well-known in the art. For example, the oppositely poled pair may be selected from the transistors indicated in Table II which follows.

The p-n-p transistor 10 has an emitter 11 and a collector 12, the latter being energized from the 20 volt negative source 18 through the 1500 ohm resistor 17. Similarly, the n-p-n transistor 14 has an emitter 15 and a collector 16, the latter of which is energized from the 20 volt positive source 20 through a 1500 ohm resistor 19. The emitter 11 is connected to ground 21 across the 220 ohm resistor 22a; and, the emitter 15 is connected to ground 23 across the 220 ohm resistor 24a. The collector 12 is connected through the 6800 ohm resistor 25 to the base 27 of transistor 28, the latter electrode being connected to ground 21 through the 8200 ohm resistor 22b. The collector 16 in transistor 14 is similarly connected through the 6800 ohm resistor 26 to the base electrode 31

TABLE I

| Resistance (25° C.) | Time Constant | | Dissipation Constant | |
|---|---|---|---|---|
| | Oil Bath | Air | Oil Bath | Air |
| 10,000 (#44006) | 1 second, maximum | 10 seconds, maximum | 8 milliwatts per ° C. | 1 milliwatt per ° C. |
| 30,000 (#44008) | do | do | do | Do. |
| 100,000 (#44011) | do | do | do | Do. |

In the present illustrative embodiment the resistance of thermistor $Th_1$ is 30,000 ohms and that of $Th_2$ is 10,000 ohms. Alternatively, the values of $Th_1$ and $Th_2$ may be 100,000 ohms and 30,000 ohms, respectively. The thermistor $Th_2$ is wrapped with a heater coil 103 of a high resistance wire, such as nichrome or the like, the terminal of which is connected through milliwatt meter 77 to the heater supply source 78. In the present embodiment, the approximate resistance of heater circuit 103 is ten ohms.

The balancing arms 104 and 105 comprise a pair of resistors, each of 100,000 ohms, respectively connected between bridge terminals W-Y and X-Y.

A preferred embodiment of the servo system 76, across the input terminals of which is connected bridge circuit 75, is described in detail and claimed in my application Ser. No. 375,501, filed at even date herewith.

In the servo system 76, an alternating signal source 1, constructed to generate signals of a few milliwatts, having frequencies within the range one to 1000 cycles per second, and which in the present illustrative embodiment has a frequency of, say, 60 cycles per second, is applied across a 100,000 ohm potential divider 2 to ground. The slider 3 is connected through the 0.1 microfarad capacitor 4 to the terminal Y of the Wheatstone bridge 75. In the present embodiment, slider 3 is adjusted to apply an alternating current voltage of, say, one volt, root mean square, between the bridge terminals Y and Z.

A pair of 1500 ohm resistors 7 and 8 are respectively connected between the terminals W and X of the bridge circuit 75 and the base electrodes 9 and 13 of a pair of oppositely poled junction transistors 10 and 14, the former of p-n-p type and the latter of n-p-n type. These may be of transistor 32, the latter electrode being connected to ground through the 8200 ohm resistor 24b.

Transistor 28, of p-n-p type, includes an emitter 29 and collector 30, the latter being energized from the negative 20 volt source 18 through the 1000 ohm resistor 35. Emitter 29 is connected to a junction with emitter 11 and to ground 21 through the resistor 22a.

Transistor 32, of n-p-n type, includes an emitter 33 and collector 34, the latter being energized from the 20 volt positive source 20 through 1000 ohm resistor 36. Emitter 33 is connected to the junction with emitter 15 and to ground 23 through the resistor 24a.

Transistors 28 and 32 may be selected, for example, from two opposite conductivity junction transistor types disclosed in Table II.

The collector 30 of the transistor 28 (point A) and the collector 34 of the transistor 32 (point B) are connected to the summing point C through the 3.3 megohm resistors 37 and 38, respectively. Summing point C is connected in series with the 47 megohm resistor 40 to the upper terminal of the one microfarad capacitor 41, which is connected to ground 42. It will be understood that the time constant of the resistance-capacitance circuit comprising capacitor 41 and resistor 47 is variable to meet the requirement of each system. A diode 39 is interposed between resistor 38 and summing point C, so that capacitor 41 can charge up without bleeding off its charge. Diode 39 can be of any of the types known in the art which is characterized by a high back resistance.

Capacitor 41 has its high potential terminal connected to the grid 43 of the electrometer tube 44. The latter tube includes a cathode 45, a plate 46, and a screen grid 47. In the embodiment under description, electrometer tube 44 is type 7851, manufactured by Tung Sol Electric Inc. of Bloomfield, N.J. The important qualification of electrometer tube 44 is that it be designed to draw a very limited grid current, of $10^{-8}$ amperes or less, and preferably, $10^{-14}$ amperes or less, whereby it senses, without significant discharge, the voltage across capacitor 41. In an alternative embodiment, a field effect transistor, of either n-channel or p-channel type, can be substituted for the electrometer tube 44.

The plate 46 of tube 44 is energized from the 10 volt positive source 48 through the 1.5 megohm resistor 49; and, the screen grid 47 is energized from the same source through the 10,000 ohm resistor 50. The cathode 45 is heated by means of a filament (not shown) which draws 200 milliamperes current across a 2.5 volt power source. The cathode 45 of tetrode 44 is connected across the one megohm resistor 51 to ground 52. The cathode 45 is also connected, in cathode follower connection, through the one megohm resistor 53 to the grid 54 of the triode 55, which is half of a 12AU7 twin triode manufactured by Tung Sol Electric Inc., the other half being triode 59. The cathodes 56 and 60, respectively, of twin triodes 55–59, are heated by a filament (not shown) which draws a current of 450 milliamperes across a three volt power source.

The plates or anodes 57 and 61, respectively, of triodes 55 and 59 are energized by direct connection to the 300 volt positive source 70. The grid 58 of triode 59 is connected to slider 67 which moves along the 10,000 ohm potential divider 66, the latter being connected between the 10 volt positive source 48 and ground 71. Preferably, the slider 67 is adjusted for the purposes of the present embodiment to impart a direct current reference voltage of desired value to the grid 58.

The output terminals 68 and 69 are respectively connected in cathode follower fashion to the cathodes 56 and 60, each of the latter being connected to ground terminals 64 and 65 through one of the 10,000 ohm resistors 62 and 63, respectively.

Output terminals 68 and 69 are connected across the input terminals of the heater supply circuit 78. This may be any type of conventional power amplifier circuit adapted to produce a power output which, in normal operation of the flowmeter, ranges between 50 and 500 milliwatts, producing a voltage drop across the heater circuit 103 which varies between one and five volts, causing the temperature of the heater to vary over a range from one to 50 degrees Fahrenheit over the ambient temperature.

For a detailed account of the operation of the foregoing servo system 76, the reader is referred to my application Ser. No. 375,501, supra, filed simultaneously with the instant application.

Assuming the bridge 75 to be in a condition of balance, the trigger circuits $T_1$ and $T_2$ operate in alternation with equal dwell times, so as to produce a series of negative pulses at point A and a series of positive pulses at point B, which are summed together at point C to produce in aggregate, a zero output signal.

Assuming that the bridge is unbalanced in such a direction as to impose a small negative bias across the servo system 76, then the trigger circuits $T_1$ and $T_2$ will still be actuated in alternation, but with unequal dwell times, so that the negative pulses produced at point A will have longer duration than the positive pulses produced at point B. These two series are again superposed at point C, producing in aggregate, a slightly negative output signal.

Assume now that the bridge circuit 75 is grossly unbalanced so as to produce a large negative bias on the signal imposed on the servo system 76. In that case, one trigger circuit is continuously triggered to the exclusion of the other, producing at point A a continuous negative signal and at point B substantially no signal at all. These two are again superposed at point C, producing a substantially larger negative output signal.

Accordingly, when the series of pulses summed at point C is substantially equal, assuming that the capacitor 41 is charged up to a predetermined charge, there will be no substantial change in this charge. However, if the two series of pulses superposed at point C have unequal dwell times, capacitor 41 will then be slowly discharged. On the other hand, if one trigger circuit has been continuously triggered to produce a negative signal, the capacitor 41 will be rapidly discharged. In the case of a small or gross unbalance in the positive direction, the polarity of the aggregate signal at point C would obviously be reversed and capacitor 41 would be charged up rapidly or slowly, depending on the size of the bias.

The change in potential across the capacitor 41 is then sensed without substantial discharge by means of the electrometer tube 44, the change in potential being impressed on its grid 43. The cathode voltage across the resistor 51 is correspondingly varied in cathode follower fashion, and is in turn applied to the grid 54 of the twin triode 55–59, from which it is amplified and applied to the output terminal 68 which is connected across the cathode resistor 62. Here, it is compared, at the opposite terminal 69, with a reference voltage from potential divider 66, which is applied through slider 67 to grid 58 of the triode 59. The output voltage across the terminals 68 and 69, which varies slowly or rapidly in such a direction as to minimize the unbalance of the bridge 75, is applied across the input terminals of the heater supply circuit 78, which is a power amplifier of the type previously described, the power output of which increases or decreases in exact correlation with the rise and fall of signal voltage across terminals 68 and 69. The power output of heater supply circuit 78 is impressed on heater circuit 103, wrapped around the thermistor 102, causing the voltage thereacross to rise or fall, respectively increasing or decreasing the temperature generated in the vicinity of thermistor 102, which, in turn, causes the resistance of the latter to rise or fall in such a direction as to rebalance bridge 75.

The milliwatt meter 77 is connected in series with the output of the heater supply 78 so as to record the power necessary to bring the bridge 75 to a condition of balance. The meter, in turn, is calibrated to measure velocity of flow, volumetric flow, or mass flow in the flowmeter in the manner previously desribed.

Figure 3A:
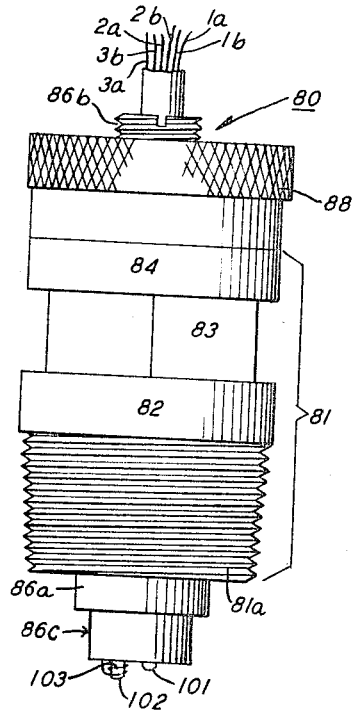
FIGURE 3D shows an alternative form of the probe head of FIGURES 3A and 3B.
Figure 3B:
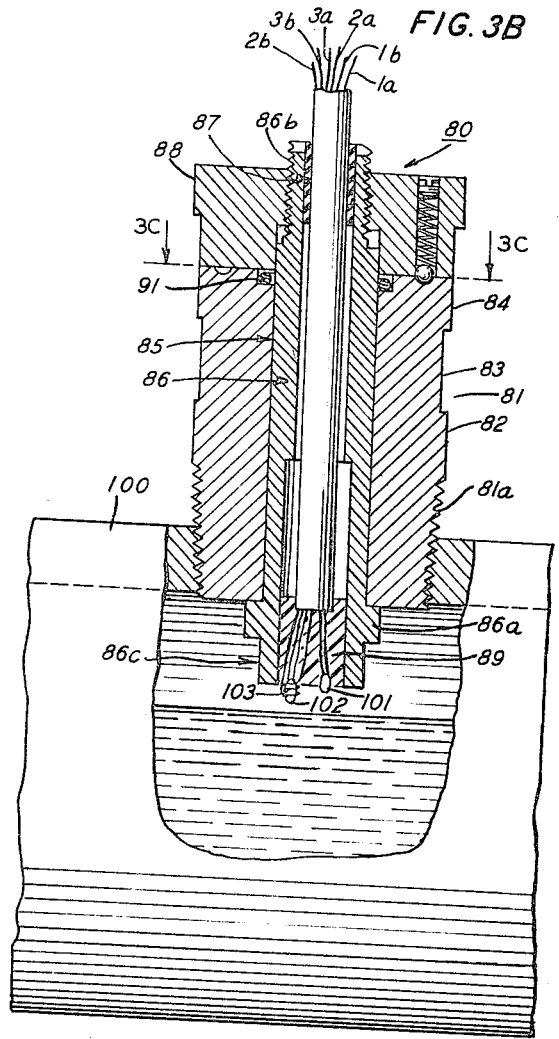
Figure 3C:
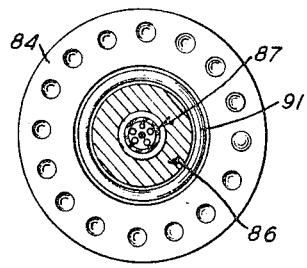

FIGURES 3A, 3B, and 3C show, respectively, in front elevation, longitudinal section, and cross section, one embodiment of the probe assembly which is adapted to be screwed into place for measuring the flow in the test pipe section 100.

The probe assemblage 80 is cylindrical, having an overall length of four inches and a maximum diameter of two inches.

The principal element of the probe housing is a stainless steel pipe section 81, two and one-half inches long and having a maximum diameter of 1.9 inches, the inwardly directed end of which has a screw threaded portion 81a for, say, the last inch. Above the screw threading 81a is a plane surfaced cylindrical portion 82 about one-half inch thick, to allow for additional threading if needed for proper installation. Above the plane portion 82 is a portion 83, say, five-eighths of an inch thick which is hexagonally machined to provide six smooth lateral surfaces to facilitate the use of a wrench in screwing the probe assemblage in place. The upper end 84, three-eighths of an inch thick, is smooth surfaced and cylindrical.

An axially located bore 85, three-fourths of an inch in diameter for most of its length and abruptly broadening to a one inch well for the outer 0.12 inch, is machined in the probe housing 81.

Fitted into the bore 85 in the probe housing 81 is a concentrically disposed steel inner sleeve 86, its outer diameter matching the inner diameter of the bore. The inner sleeve 86 has an over-all length of four inches and is supported at its inner end on an annular flange 86a, one-quarter of an inch thick, which rests against the inner end of the screw threaded portion of housing 81 so that the end of sleeve 86 forms a cylindrical protrusion or probe head 86c, extending one and one-eighth inches beyond the end of the housing. The upper end of metal sleeve 86 extends outwardly fifteen-sixteenths of an inch from housing 81 and terminates in a screw threaded portion 86b which is three-quarters of an inch long. The metal sleeve 86 has an inner diameter of one-half inch for the lower one and five-eighths inches of its length, which abruptly narrows to three-eighths of an inch for the remaining upper portion.

Figure 1:
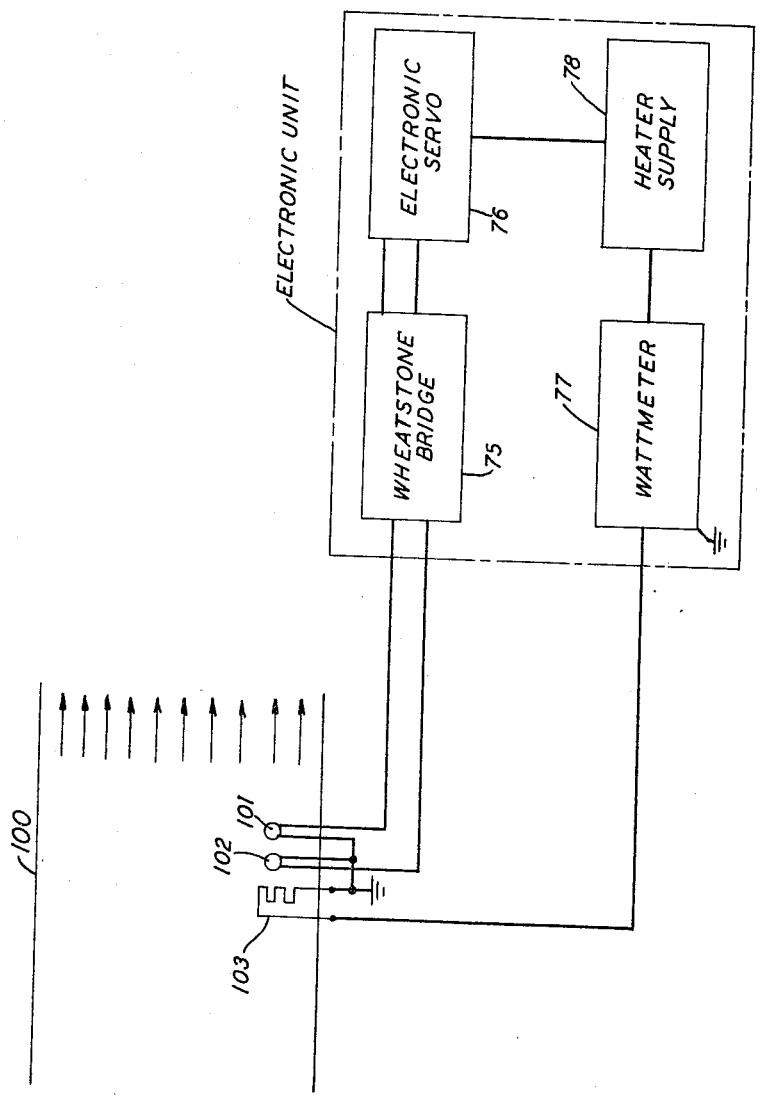

Interposed in the metal sleeve 86 is an insulating conduit 87 of polyethylene or the like, which contains six leads, two pairs of which, 1a, 1b and 2a, 2b, are respectively connected to the terminals of two bead thermistors 101 and 102, which in the embodiment under description take the forms indicated in Table I with reference to the description of FIGURE 1 of the drawings.

Thermistors 101 and 102 are interposed in the probe head 86c of the sleeve 86, protruding therefrom, say, one-sixteenth of an inch, in position to contact the flowing liquid and are spaced apart laterally about one-quarter of an inch. The thermistor 102 is wrapped with a length of approximately one inch of fine heating coil of, for example, 0.014 gauge nichrome wire, having a specific resistance of, say, 10 ohms per inch, to which are connected the two additional leads 3a and 3b from the conduit. Each of the six leads 1a, 1b, 2a, 2b, 3a, and 3b is drawn out of the upper end of the conduit for connection with the other circuit elements as indicated in the circuit schematic of FIGURE 1.

Figure 3D:
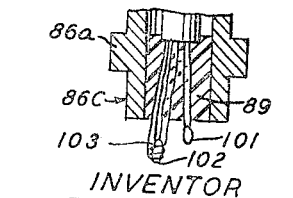

Prior to the mounting of the final cap 88 on the probe assemblage, the hollow lower portion of the sleeve 86 is filled up to about the upper level of flange 86a with epoxy resin 89 which substantially covers the thermistors 101 and 102 and the heater coil 103, holding the same in position, preventing short circuiting and protecting them from the corroding effects of the contacting liquid in the test pipe section 100. In the embodiment of FIGURES 3A and 3B, the thermistors 101 and 102 protrude very slightly, say, one-eighth to one-quarter of an inch, from the end of the probe. In an alternative embodiment of the invention, shown in FIGURE 3D of the drawings, the controlling thermistor 102, surrounded by heater coil 103, is extended one-quarter to one-half of an inch into the interior of the pipe beyond the end of the other thermistor, 101. In any case, the minimum separation between thermistors 101 an 102 is such that the change in the resistance of thermistor 101 due to proximity to the heater coil on thermistor 102 is less than about 0.1 percent. The maximum separation between thermistors 101 and 102 is immaterial as long as the temperature difference between the elements due to ambient conditions does not exceed one degree centigrade.

An epoxy resin suitable for the purposes of the present invention is obtained commercially from the Shell Chemical Company under the trade name "Epon 8" and is cured in accordance with directions with a curing agent such as diethylene triamine. Preferably, a hardener is used in connection with the curing of the resin 89 so as to provide a strong adhesive coupling, the strength of which does not deteriorate with heating. A catalyst known as "Hardener A" which is manufactured by the Shell Chemical Company has been used in combination with "Epon 8" with good results for the purpose of the present invention.

After the conduit assemblage and metal sleeve 86 have been mounted in the bore 85 and the epoxy resin 98 has properly set to hold the assemblage in position, an insulating washer 91 is interposed to hold conduit 87. The cylindrical steel top 88 is then mounted on the assemblage under a torque of, say 10 foot-pounds, to hold the assemblage together. The steel top 88 is three-quarters of an inch thick, the upper half having a diameter of two inches, the peripheral edge of which is roughened by cross hatching; and the lower half having a diameter of about 1.9 inches. The top 88 has an axially disposed bore, the lower half of which is three-quarters of an inch in diameter to match the diameter of bore 85 of the housing 84, and the upper half of which is screw threaded and has a diameter of five-eighths of an inch to match the outer diameter of the screw threaded portion 86b on which it is accommodated.

Finally, the entire probe 80 is screwed into place in the test pipe section 100 by means of the screw threads 81a, so that the thermistors 101 and 102 in the probe head 86c protrude into and contact the passing liquid. The probe assemblage 80 is then screwed into the test pipe section 100 to a depth which will be carefully measured in accordance with certain theoretical considerations which will now be discussed with reference to FIGURE 4 of the drawings.

Figure 4:
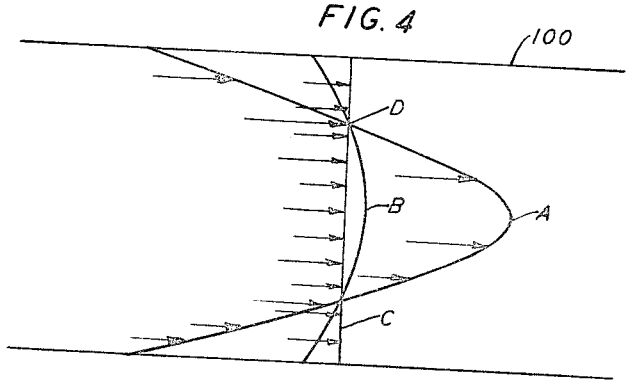
FIGURE 4 is a diagram of velocity profiles under different conditions of flow in the test pipe, illustrating the considerations for optimum placement of the probe in accordance with the present invention.

FIGURE 4 is a schematic showing of the interior of a section of test pipe, in which the velocity profile of the liquid is indicated under different condition of flow. The parabolic curve A shows the contour of the leading surface of the liquid under a condition of irrational or laminar flow; whereas, the hyperbolic curve B shows the contour of the leading surface of the liquid under conditions of turbulent flow. The straight line C indicates the average velocity in the pipe which is substantially the same for each of the conditions indicated by curves A and B. It has been discovered, in accordance with the present invention, that the crossover point D of these curves, when theoretically plotted, is the optimum point, or actually, a semicircle of points, for placement of the heated thermistor 102 in contact with the flowing liquid. This optimum position D, for placement of the thermistor 102, has been found in actual practice to be a distance from the inner surface of the pipe section 100 equal to about one-tenth of the inner pipe diameter.

In accordance with an alternative embodiment of the present invention, the transistor servo system 76, shown and described in the preceding portions of the specification with reference to FIGURE 2 of the drawings, is replaced by a circuit 76' shown schematically, in its entirety, in FIGURES 8 and 9 of the drawings, mounted side-by-side, with FIGURE 8 to the left and FIGURE 9 to the right. The transistor differential amplifier unit, which is indicated by the dotted line box marked 79 in FIGURE 8, is shown separately in FIGURE 5 of the drawings, together with FIGURES 6A, 6B, 6C, and 6D, which are graphical showings of signal voltages used in an explanation of its operation, and FIGURE 7, which is an alternative form of the differential amplifier using vacuum tubes.

Referring now to the circuit of FIGURES 8 and 9, as in the embodiment of FIGURE 2, thermistors 101 and 102 are connected in a Wheatstone bridge 75, the balancing arms of which comprise the resistors 104 and 105. It will be assumed that the components of the bridge circuit 75 are the same as described with reference to FIGURE 2, hereinbefore; and, that the probe assemblage, including thermistors 102 and 102 and heater circuit 103, is similar to that described with reference to FIGURES 3A, 3B, and 3C, and the alternative form, FIGURE 3D.

An oscillator 71, which may be of any of the types well-known in the art, and which in the present illustrative embodiment supplies alternating current up to frequencies of one kilocycle, at a maximum power of one watt, and a peak-to-peak voltage of 50 volts, is connected to terminal Y of bridge circuit 75 at the junction between balancing arms 104 and 105. In addition to imposing a high frequency alternating current across the Y-Z terminals of the Wheatstone bridge 75, the oscillator 71 is simultaneously connected to trigger a square-wave pulse generator 72. The latter may assume any of the types well-known in the art, such as, for example, the circuit configuration known as the Schmitt Trigger, previously referred to with reference to FIGURE 2, which is shown in FIG. 28.10 and described in detail in Section 28.4, et seq., beginning on page 381 of Transistor Circuit Design, prepared by the Engineering Staff of Texas Instruments Incorporated, McGraw-Hill Book Company, Inc., New York, N.Y., 1963. This circuit produces a square top pulse having a maximum negative voltage of, say, nine volts at a repetition rate which is thereby synchronized with the alternating current oscillations imposed across the Wheatstone bridge 75. The negative pulses from square-wave pulse source 72 which, for example, have a mark duration of one millisecond and a space duration of one millisecond (for the purpose of the present illustration, utilizing a one kilocycle triggering source) are imposed through a conducting lead including the 100,000 ohm resistor 128 on the base electrode of transistor 132 in a gate circuit connected in a manner to be presently described.

The W–X terminals of bridge circuit 75 are connected to opposite terminals of the differential amplifier circuit 79, including transistors 111 and 112. The W terminal is at the junction between thermistor 101 and the arm 104; and, the X terminal is at the junction between the heated thermistor 102 and the balancing arm 105. Transistors 111 and 112 of the differential amplifier circuit may, for example, be Radio Corporation of America p-n-p type germanium transistors 2N1305, or any of the p-n-p types indicated in Table II, hereinbefore. The transistor 111 has emitter, collector, and base electrodes 113, 115, and 117, respectively; and, transistor 112 has emitter, collector, and base electrodes 114, 116, and 118, respectively. The emitters 113 and 114 are connected to a common junction, which is connected through a 15,000 ohm resistor 121 to the positive terminal of a nine volt battery 110, to the negative terminal of which is connected the collector 115. The collector 116 is connected through a 4700 ohm resistor 123 to the negative terminal of the nine volt source 110.

The X terminal of bridge circuit 75 is connected through the 100,000 ohm resistor 108 to the base electrode 117 of transistor 111, across the 68,000 ohm resistor 107 to ground. Base electrode 117 is also connected through the 100,000 ohm resistor 109 to the negative terminal of the nine volt source 110.

On the opposite side of the differential amplifier, the base electrode 118 of transistor 112 is connected to the W terminal of the bridge circuit through the 100,000 ohm resistor 106, across the 68,000 ohm resistor 120 to ground. Base electrode 118 is also connected to the negative terminal of the nine volt source 110 through the 100,000 ohm resistor 122.

The output circuit of the differential amplifier is connected to the junction between resistor 123 and collector 116, and passes through the two microfarad capacitor 125 in series with the 100,000 ohm resistor 126, to the high potential input terminal of the one kilocycle amplifier 127, across the 68,000 ohm resistor 119 to ground. The input terminal of amplifier 127 is connected through the 100,000 ohm resistor 124 to the negative terminal of the nine volt source 110. The amplifier 127 may be selected from any of the audio-amplifier types well-known in the art, which operate with substantially zero phase shift in the one megacycle range. The output terminals of the one kilocycle amplifier 127 are connected across the input terminals of a phase shifter 131. The output circuit of the latter is connected in series with a 10,000 ohm resistor 149 to the collector 134 of a transistor 132. Phase shifter 131 may assume any of the forms well-known in the art, such as shown and described, for example, in Electronic Measurements by Terman and Pettit, second edition, McGraw-Hill, New York (1952), Fig. 633A and page 277, paragraphs 6–11 entitled "Phase Shifters."

Transistor 132 is the principal element of a transistor gate circuit of the form described in detail in my application Ser. No. 345,780, filed Feb. 18, 1964. The transistor 132 comprises an emitter electrode 133, a base electrode 135, and a collector electrode 134. The square-wave pulse source 72, of a form previously described, is connected in series with a 100,000 ohm resistor 128, to the base electrode 135 of transistor 132. It will be apparent, however, that any of the other types of gate circuits well-known in the art can be substituted for the particular type shown and described herein.

Assume, for example, that the transistor 132 is a p-n-p junction transistor, such as Radio Corporation of America type 2N1305 or one of the other p-n-p types disclosed in Table II, hereinbefore. Mark pulses from the square-wave source 72, when imposed on the base electrode 135 of the transistor 122, will be negative and of such a polarity as to drive the transistor into current conduction between the collector electrode 134 and the emitter electrode 133, to a condition of saturation for the duration of such pulses. Between the base electrode 135 and emitter electrode 133, is connected a back-biasing source 137 of, for example, nine volts, the positive terminal of which is connected through the one megohm resistor 136 to the base 135; and, the negative terminal of which is connected through the 27,000 ohm resistor 149 to ground. A 10 microfarad capacitor 140 is connected between the positive terminal of the back-biasing source 137 and ground.

The output terminal connected from the collector electrode 134 passes through a 27,000 ohm resistor 138 to a push-pull circuit comprising a pair of transistors 141 and 142, of opposite conductivity types, p-n-p and n-p-n, respectively, and which pair may be selected from those disclosed, for example, in Table II, hereinbefore. Transistor 141 has emitter, collector, and base electrodes, respectively 144, 148, and 146; and, transistor 142 has emitter, collector, and base electrodes, respectively 143, 147, and 145. The two base electrodes 145 and 146 are connected together at the input of the push-pull circuit at junction 139, to one terminal of the resistance 138. The collector electrodes 148 and 147 are respectively connected, the one to the negative terminal of the nine volt source 151, and the other, to the positive terminal of the nine volt source 150, the opposite terminals of the latter sources being grounded.

Emitter electrodes 143 and 144 are connected together to an integrator circuit, which includes the following elements. The 100,000 ohm resistor 153 is connected in series with a 1000 ohm resistor 155, the junction between resistors 153 and 155 being connected to ground 154 through the two microfarad capacitor 156a. The other terminal of resistor 155, which is connected to base electrode 159 of transistor 158, is also connected to ground through the 100 microfarad capacitor 156b. Resistor 157 is connected in parallel with capacitor 156b to ground across the base electrode 159 of transistor 158, which has an emitter electrode 161, and a collector electrode 162. Transistor 158, in the present embodiment, is a p-n-p type, which may be selected from those set forth in Table II, hereinbefore.

Transistor 158, together with the transistor 164, which is a similar type, functions as a direct current control amplifier circuit for the integrated direct current derived from the pulses that are passed from the push-pull circuit through the integrator circuit just previously described. In detail, the direct current amplifier circuit consists of the following elements. A 47,000 ohm resistor 160 is connected to the negative terminal of the nine volt battery 151. The emitter 161 of transistor 158 is connected to the base 163 of transistor 164, which has an emitter electrode 165 and a collector electrode 166. The latter is connected through the 1000 ohm resistor 167, to the negative terminal of the nine volt battery 151. Emitter 165 is connected through a lead 73 which carries the integrated direct current to drive the heater power supply circuit 78, previously described with reference to FIGURES 1 and 2. The output from the heater supply circuit 78 then passes through the milliwatt meter 77 to the heater circuit 103 of thermistor 102 in the probe assembly, where it operates to balance bridge circuit 75, as previously described.

The circuit operation of FIGURES 8 and 9 can be best understood by a preliminary analysis of the operation of the differential amplifier circuit including transistors 111 and 112, which is indicated with the dotted line box marked 79, with reference to FIGURES 5 and 6A, 6B, 6C, and 6D of the drawings.

Referring to FIGURE 5, input signals from the two separate sources, which will be designated $I_1$ and $I_2$, are imposed on the two sides of the differential amplifier circuit. These two signals are of the same frequency and phase, the only parameter by which they differ being the amplitude. Let us assume that the amplitude of the input signal $I_1$, which is imposed on the base circuit 117 may then be equal to, less than, or greater than the signal $I_2$.

The present circuit so functions that when the two signals are equal in amplitude, zero, output voltage is produced in the signal output circuit between collector 116 and ground in the circuit of transistor 112. When one of signals $I_1$ and $I_2$ differs in amplitude from the other, the voltage across the output circuit is proportional to the difference. Thus, the phase of the output signal, when compared to one of the input signals, will clearly show whether the other input signal is larger or smaller in amplitude. This is better understood by reference to FIGURES 6A, 6B, 6C, and 6D of the drawings.

In FIGURES 6A and 6B, which represent the first case, it is assumed that the input signal $I_1$ is less than the reference signal $I_2$. In this case the output signal, as shown in FIGURE 6B, is in phase with the input signal and has an amplitude which is equal to the difference of the two signals, that is, the amplitude of signal $I_2$ minus the amplitude of signal $I_1$. In the second case the input signal $I_1$ is greater than the reference signal $I_2$, as indicated in FIGURE 6C. Thus, as shown in FIGURE 6D, in this case the output signal is out of phase with the reference signal and has an amplitude which is equal to the absolute value of the amplitude of signal $I_2$ minus the amplitude of signal $I_1$. The negative value indicates a phase reversal of 180 degrees. Thus the amplitude of the output signal will indicate by what amount it is larger or smaller than the reference signal; and, the phase of the output signal will indicate which of the two signals is larger.

Under the foregoing conditions, the circuit of FIGURE 5 will be seen to function as a precise amplitude comparator between two signals of the same frequency and phase which differ only in amplitude. Thus, assume that the output from this differential amplifier circuit coming off of the collector 116 of the transistor 112 is imposed on a phase comparator circuit 131, which may take the form of a gating circuit such as that comprising the transistor 132 as indicated in FIGURE 9, which is triggered by a series of gating pulses synchronized with and in phase with the input pulses $I_1$ and $I_2$. Thus, the gate will be open to pass either the positive half cycle or the negative half cycle, depending on whether the amplifier output is in phase with or out of phase with the triggering signals. The polarity of the series of output pulses from the phase comparator then indicates whether the amplitude of signal $I_1$ is less than or greater than the amplitude of signal $I_2$. A zero output of the phase comparator implies that the two components have equal amplitude.

It will be apparent to those skilled in the art that in accordance with the present invention, instead of a circuit utilizing a pair of transistors 111 and 112, as indicated in FIGURE 5, there can be substituted therefor a vacuum tube circuit of the form shown in FIGURE 7. In FIGURE 7, vacuum tube 111' has a plate 115', cathode 113', and grid 117'; and, vacuum tube 112' has a plate 116', cathode 114', and grid 118'. The two cathodes 113' and 114' are connected together to a 15,000 ohm resistor 121' which is connected to a 150 volt B— source 110'. The plate 116' is connected through the 10,000 ohm resistor 123' to the B+ terminal of the 300 volt source 110', to which terminal is also connected the plate 115'. The output from the plate 116' is connected to the phase comparator circuit 131'.

In a manner similar to the operation of the transistor circuit shown in FIGURE 5, the vacuum tube circuit of FIGURE 7 functions with signal $I_1$ being applied to the grid 117' across the resistance 107'; and, signal $I_2$ being applied to the grid 118' across the resistance 120'. Thus, the signal output which is measured in the phase comparator 131' will be similar to that derived from the circuit of FIGURE 5 and will correspond to the showings of FIGURES 6A, 6B, 6C, and 6D.

Let us now return to a discussion of the operation of the circuit of FIGURES 8 and 9 of the drawings. The two signals, $I_1$ and $I_2$, which were respectively applied to the bases 118 and 117 of the transistors 111 and 112, are derived as follows. Signal $I_1$ is derived directly from the X terminal of the bridge circuit 75, at the junction between thermistor 102 and resistor 105, through the 100,000 ohm resistor 108. The reference signal $I_2$ is derived from the W terminal of the bridge 75, at the junction between thermistor 101 and resistor 104, through the 70,000 ohm resistor 106. These two signals, after passing through a respective one of transistors 111 and 112, are superposed in the collector circuit of the transistor 112, which is connected through the two microfarad capacitor 125 and the 1000 ohm resistor 126 to the terminal of the one kilocycle amplifier 127, the output from which passes through the phase shifter 131. The signals imposed on the input circuit of the amplifier 127 are either in phase with or 180 degrees out of phase with the synchronizing signal from the one kilocycle oscillator 71. The amplified signal from amplifier 127 passes through the phase shifter 131 to the collector 135 of the transistor gate circuit 132. The latter is triggered to conducting and nonconducting condition by a series of negative pulses from the square-wave pulse source 72, the frequency or repetition rate of which is in turn controlled by the one kilocycle oscillator 71. Thus, there appears at the collector of the transistor 132 a series of pulses having a repetition rate which is synchronous with the frequency of the one kilocycle oscillator 71, which pulses are positive or negative depending on whether the signal output of the differential amplifier is over or under the amplitude of the reference signal. A zero output indicates that the two amplitudes are equal.

Accordingly, a series of positive or negative pulses, whichever may be the case, is then amplified through the push-pull transistor circuit including the transistors 141 and 142. The amplified signal from the push-pull circuit including transistors 141 and 142, is then impressed on the integrator circuit where it operates to charge or discharge capacitors 156a and 156b, depending on the polarity. The integrated output, of one polarity or the other, is then amplified in the direct current amplifier including transistors 158 and 164, the amplified output of which is used to drive a power amplifier in heater supply circuit 78. The heater power, which varies as the output of the transistor servo system 76, passes through the milliwatt meter 77 and into heater circuit 103, wrapped around thermistor 102, causing the latter to heat up and change its resistance, thereby tending to bring the bridge 75 into a condition of balance.

As in the embodiment previously described, the milliwatt meter 77 may be calibrated to read milliwatts in terms of feet per second flow in the flowmeter, or alternatively, to read volumetric flow in terms of gallons per second, or mass flow in terms of pounds per second.

It will be understood by those skilled in the art, that the embodiments shown and described herein are merely illustrative of the principles of the present invention, the scope of which is set forth in the appended claims.

What I claim is:

1. A flowmeter for measuring fluid flow in a conduit comprising in combination a pair of thermally sensitive resistance devices, said thermally sensitive resistance devices mounted in a probe adapted to be interposed in a preselected position in said conduit wherein said devices encased in a substantially uniformly insulating protective environment are in contact with the fluid flowing in said conduit under substantially the same ambient conditions, a heating coil disposed in said probe to heat one of said thermally sensitive resistance devices without substantially heating the other of said devices, a bridge circuit having four arms and four terminals, said thermally sensitive resistance devices connected as two of the arms of said bridge and a pair of balancing impedance members connected as the opposite arms of said bridge, a source connected to impose an alternating voltage across said bridge circuit, a servo system including an electronic comparator circuit connected across the diametrically opposite terminals of said bridge, said comparator circuit constructed and arranged to compare the signals from opposite terminals of said bridge circuit to produce in response to a condition of unbalance in said bridge circuit a series of composite output pulses having a frequency characteristic at least partially synchronized with the frequency of said alternating current source, the aggregate of said pulses providing an overall positive or negative output depending on the sense and degree of said unbalance, means including a charge storing circuit responsive to the pulsed output of said comparator circuit for increasing or decreasing its reservoir of electrical charge, a power supply responsive to the variations in output from said charging means to energize or deenergize said heating coil in a direction to correct the condition of unbalance in said bridge circuit, and measuring means for measuring the power generated by said power supply, said measuring means being calibrated to measure the flow in said flowmeter.

2. The combination in accordance with claim 1 wherein said probe is mounted in said conduit so that the position of said thermally sensitive resistance device heated by said heating coil substantially coincides with a point on the crossover curve between the surface of revolution representing the velocity profile of the test fluid flowing in said conduit and a plane surface representing the average velocity of said fluid in said conduit.

3. The combination in accordance with claim 1 wherein said probe is mounted in said conduit so that the position of said thermally sensitive resistance device heated by said heating coil substantially coincides with a point on the crossover curve between a parabolic surface of revolution generated by laminar flow of the test fluid in said pipe and a hyperbolic surface of revolution generated by turbulent flow of said fluid.

4. The combination in accordance with claim 1 wherein said probe is mounted so that said thermally sensitive resistance device heated by said heating coil is in a position along a circle within and concentric with the inner surface of said conduit and having a separation therefrom approximating one-tenth the inner diameter of said conduit.

5. The combination in accordance with claim 1 wherein said thermally sensitive resistance device heated by said heating coil is mounted in said probe in a position which is substantially radially extended into the interior of said conduit with respect to the other said thermally sensitive resistance device.

6. A flowmeter in accordance with claim 1 wherein the heated one of said thermally sensitive resistance devices has a resistance roughly one-third as large as that of the other thermally sensitive resistance device.

7. A flowmeter in accordance with claim 1 wherein one said thermally sensitive resistance device is displaced in the direction of fluid flow in said conduit from the other said thermally sensitive resistance device a distance approximating one-quarter of an inch.

8. A flowmeter for measuring fluid flow in a conduit comprising in combination a pair of thermally sensitive resistance devices, said thermally sensitive resistance devices mounted in a probe adapted to be interposed in a preselected position in said conduit wherein said devices are in contact with the fluid flowing in said conduit under substantially the same ambient conditions, a heating coil disposed to heat one of said thermally sensitive resistance devices without substantially heating the other of said devices, a bridge circuit having four arms and four terminals, said thermally sensitive resistance devices connected as two of the arms of said bridge and a pair of balancing impedance members connected as the opposite arms of said bridge, a transistor servo system connected across diametrically opposite terminals of said bridge, said servo system comprising in combination two trigger circuits each comprising a pair of transistors of opposite conductivity type to the other trigger circuit of said pair, said trigger circuits connected at their input terminals across said diametrically opposite bridge terminals symmetrically with reference to ground potential, two sources of substantially equal potential and opposite polarity, said sources respectively connected to each of said trigger circuits to energize the transistors thereof in a forward direction, one of the transistors in each said trigger circuit connected to be normally conducting at a low saturation voltage in response to input signals below a preselected reference value in the polarity of its energizing source, the other said transistor in each said trigger circuit connected to be triggered to conduct at a substantially higher level of current conduction in response to input signals above said preselected value in the polarity of its energizing source, said trigger circuits connected at their output terminals to a summing point for summing the outputs of said trigger circuits, an alternating current signal source connected between high and low potential terminals of said bridge circuit at the input terminals to said trigger circuits, for impressing on said trigger circuits a balanced alternating current signal voltage having peak values exceeding said preselected value, a charge storing circuit connected to said summing point and adapted to be charged or discharged in response to the polarity of the sum of the output signals from said trigger circuits, and at a rate which is a function of the magnitude of said sum, sensing means connected to said charge storing circuit for sensing the voltage thereacross without substantially discharging said charge storing circuit, means connected to said sensing means for constantly comparing the aggregate potential across said charge storing circuit with a preselected reference value, a power supply circuit connected to said heating coil to generate power to heat up said heating coil, said power supply circuit responsive to the signal from said comparing means to increase or decrease the power in said heating coil in a manner to reduce the unbalance of said bridge circuit, and measuring means for measuring the power generated by said power supply system, said measuring means being calibrated to measure the flow in said flowmeter.

9. The combination in accordance with claim 8 wherein said probe is mounted in said conduit so that the position of the said thermally sensitive resistance device heated by said heating coil substantially coincides with a point on the crossover curve between the surface of revolution representing the velocity profile of the test fluid flowing in said conduit and a plane surface representing the average velocity of said fluid in said conduit.

10. The combination in accordance with claim 8 wherein said probe is mounted in said conduit so that the position of the said thermally sensitive resistance device heated by said heating coil substantially coincides with a point on the crossover curve between a parabolic surface of revolution generated by laminar flow of the test fluid in said pipe and a hyperbolic surface of revolution generated by turbulent flow of said fluid.

11. The combination in accordance with claim 8 wherein said probe is mounted so that said thermally sensitive resistance device heated by said heating coil is in a position along a circle within and concentric with the inner surface of said conduit and having a separation therefrom approximating one-tenth the inner diameter of said conduit.

12. The combination in accordance with claim 8 wherein said one thermally sensitive resistance device heated by said heating coil is mounted in said probe in a position to contact the fluid flowing in said conduit, and wherein the other said thermally sensitive resistance device is substantially recessed in said probe with respect to said one thermally sensitive resistance device in a radial direction in said conduit.

13. A flowmeter in accordance with claim 8 wherein said temperature sensitive resistance devices comprise thermistors, and wherein one of said thermistors heated by said heating coil has a resistance which is roughly three times the resistance of the other one of said thermistors.

14. A flowmeter in accordance with claim 8 wherein said one thermally sensitive resistance device is displaced from the other of said devices a distance approximating one-quarter of an inch in the direction of flow in said conduit.

15. A flowmeter in accordance with claim 1 wherein the electrical comparator circuit of said servo system includes:
a differential amplifier having two pairs of input terminals and a single pair of output terminals, said input terminals respectively connected to said thermally sensitive resistance devices at opposite terminals of said bridge circuit to receive signals of the same frequency and phase which differ in amplitude under a condition of unbalance in said bridge circuit, said differential amplifier circuit constructed and arranged to produce an output signal at said output terminals in response to said input signals which is the algebraic difference between said signals, whereby under a condition of unbalance of said bridge circuit said output signal is substantially in phase with or 180 degrees out of phase with said input signals depending on the direction of unbalance of said bridge circuit, and
means connected to receive the output signal from said differential amplifier comprising a gating circuit triggered in synchronism with said source of alternating current to be operated and closed during alternate half cycles, whereby to produce a series of pulses of a single polarity whose amplitude and polarity are functions of the magnitude and direction of unbalance of said bridge circuit.

16. The combination in accordance with claim 15 wherein said probe is mounted in said conduit so that the position of said thermally sensitive resistance device heated by said heating coil substantially coincides with a point on the crossover curve between the surface of revolution representing the velocity profile of a test fluid flowing in said conduit and a plane surface representing the average velocity of said fluid in said conduit.

17. The combination in accordance with claim 15 wherein said probe is mounted in said conduit so that the position of said thermally sensitive resistance device heated by said heating coil substantially coincides with a point on the crossover curve between a parabolic surface of revolution generated by laminar flow of the test fluid in said pipe and a hyperbolic surface of revolution generated by turbulent flow of said fluid.

18. The combination in accordance with claim 15 wherein said probe is mounted so that said thermally sensitive resistance device heated by said heating coil is in a position along a circle within and concentric with the inner surface of said conduit and having a separation therefrom approximating one-tenth the inner diameter of said conduit.

19. The combination in accordance with claim 15 wherein said thermally sensitive resistance device heated by said heating coil is mounted in said probe in a position which is substantially radially extended into the interior of said conduit with respect to the other said thermally sensitive resistance device.

20. A flowmeter in accordance with claim 15 wherein the heated one of said thermally sensitive resistance devices has a resistance roughly one-third as large as that of the other thermally sensitive resistance device.

21. A flowmeter in accordance with claim 15 wherein one said thermally sensitive resistance device is displaced in the direction of fluid flow in said conduit from the other said thermally sensitve resistance device a distance approximating one-quarter of an inch.

22. A flowmeter in accordance with claim 1 wherein the electrical comparator circuit of said servo system includes:
a differential amplifier circuit comprising a pair of current discharge devices having substantially equal parameters, each of said devices having a first electrode for emitting a stream of current carriers, a second electrode for collecting carriers of said stream, and a control electrode, said control electrodes respectively connected to opposite terminals of said bridge circuit across equal resistances $R_1$ and $R_2$ for deriving signals from each of said opposite terminals.
said first electrodes connected together to a common junction,
means including a first source of potential connected to said junction through a resistance $R_5$ for energizing each of said first electrodes to emit a stream of current carriers,
a second source of potential of opposite polarity to said first source of potential connected directly to the collecting electrode of said one current discharge device and through a resistance $R_0$ to the collecting electrode of said other current discharge device for biasing each of said electrodes to collect said current carriers,
an output circuit connected to the collecting electrode of said other discharge device for superposing signals derived from said opposite terminals to produce an output signal which is the algebraic difference between said signals, said output signal being substantially in phase with or 180 degrees out of phase with the signals derived from said bridge circuit, depending on the direction of unbalance of said bridge circuit,
a gating circuit triggered in synchronism with said alternating current source, said gating circuit connected to impose a series of gating pulses on the output signal from said differential amplifier circuit, whereby to produce a series of positive or negative pulses depending on the phase of said output signal.

23. A flowmeter in accordance with claim 22 wherein said current discharge devices in said differential amplifier comprise a pair of transistors each having emitter, collector, and base electrodes, said base electrodes connected to opposite terminals of said bridge circuit across equal resistances $R_1$ and $R_2$, wherein said base circuits are initially adjusted to provide equal current biases in each of said transistors, and wherein said transistors are initially matched to have substantially equal parameters, providing substantially equal collector currents in said transistors.

24. A flowmeter in accordance with claim 22 wherein said current discharge devices in said differential amplifier comprise a pair of electron discharge tubes, each having a cathode, an anode, and a control grid, said control grids connected to opposite terminals of said bridge circuit across equal resistances $R_1$ and $R_2$, wherein said control grids are initially adjusted at the same negative voltage bias in each of said tubes, and wherein the parameters of said tubes including their amplification factors, are substantially equal.

25. A flowmeter in accordance with claim 22 for measuring fluid flow in a conduit comprising in combination a phase shifter connected between said output circuit and said gating circuit for adjusting the phase of said output signal to be exactly in phase with or 180 degrees out of phase with said gating pulses.

References Cited
UNITED STATES PATENTS

| | | | |
|---|---|---|---|
| 2,437,449 | 3/1948 | Ames et al. | |
| 2,972,885 | 2/1961 | Lamb | 73—204 |
| 2,994,222 | 8/1961 | Laub | 73—204 |
| 3,015,232 | 1/1962 | Schnoll | 73—204 |
| 3,199,348 | 8/1965 | Salera | 73—204 |

FOREIGN PATENTS

| | | |
|---|---|---|
| 651,152 | 3/1951 | Great Britain. |

RICHARD C. QUIESSER, *Primary Examiner.*

E. GILHOOLY, *Assistant Examiner.*